(12) United States Patent
Yamada

(10) Patent No.: US 7,942,600 B2
(45) Date of Patent: May 17, 2011

(54) COUPLING APPARATUS FOR PASSAGE BLOCKS

(76) Inventor: Akira Yamada, Osaka (JP)

( * ) Notice: Subject to any disclaimer, the term of this patent is extended or adjusted under 35 U.S.C. 154(b) by 219 days.

(21) Appl. No.: 11/921,759

(22) PCT Filed: Jun. 9, 2005

(86) PCT No.: PCT/JP2005/010988
§ 371 (c)(1),
(2), (4) Date: Dec. 7, 2007

(87) PCT Pub. No.: WO2006/131989
PCT Pub. Date: Dec. 14, 2006

(65) Prior Publication Data
US 2009/0038698 A1    Feb. 12, 2009

(51) Int. Cl.
*F16C 11/06*    (2006.01)
(52) U.S. Cl. .................. 403/34; 403/37; 403/353
(58) Field of Classification Search .......... 403/34–39, 403/348, 349, 353; 411/549–553
See application file for complete search history.

(56) References Cited

U.S. PATENT DOCUMENTS

| | | | | |
|---|---|---|---|---|
| 3,554,075 A | * | 1/1971 | Johnson | 411/349 |
| 3,811,157 A | * | 5/1974 | Schenk | 411/349 |
| 3,880,546 A | * | 4/1975 | Segal | 408/204 |
| 4,385,577 A | * | 5/1983 | Graham | 112/258 |
| 4,459,785 A | * | 7/1984 | Zimmer | 451/398 |
| 4,515,037 A | * | 5/1985 | Block | 74/553 |
| 4,546,841 A | * | 10/1985 | Sipiano | 180/181 |
| 4,773,788 A | * | 9/1988 | Ruhl | 403/24 |
| 5,076,748 A | * | 12/1991 | Waterfield et al. | 411/551 |

(Continued)

FOREIGN PATENT DOCUMENTS

JP    08-326943    12/1996

(Continued)

OTHER PUBLICATIONS

International Search Report for PCT Application No. PCT/JP2005/010988, mailed Nov. 22, 2005.

*Primary Examiner* — Victor MacArthur
(74) *Attorney, Agent, or Firm* — Edwards Angell Palmer & Dodge LLP

(57) ABSTRACT

A passage block coupling apparatus including a bolt insertion hole 13 and a pin insertion hole 14 formed in an upper-stage passage block 3, a screw hole 15 and a non-screw hole 16 that are formed in a lower-stage passage block 4, a bolt 11 that is inserted into the bolt insertion hole 13, and threaded with the screw hole 15, and a positioning pin 12 that is inserted to the pin insertion hole 14, with its lower end portion being fitted to the non-screw hole 16. A cut-out section 17 is formed near the lower end portion of the positioning pin 12, and a protruding portion 18 to be fitted to the cut-out section 17 is formed on the opening portion of the non-screw hole 16. A tightening force exerted by the bolt 11 and a force exerted by the lower end portion of the positioning pin 12 to press the protruding portion 18 of the non-screw hole 16 upward are balanced with each other so that an evenly fastened state is achieved so that the passage blocks 3 and 4 are coupled with each other.

1 Claim, 7 Drawing Sheets

(a)

(b)

U.S. PATENT DOCUMENTS

| | | | | |
|---|---|---|---|---|
| 5,255,827 A * | 10/1993 | Breault et al. | | 222/309 |
| 5,564,860 A * | 10/1996 | Amann | | 405/118 |
| 5,593,265 A * | 1/1997 | Kizer | | 411/552 |
| 5,688,093 A * | 11/1997 | Bowers | | 411/552 |
| 5,819,949 A * | 10/1998 | Schaaf et al. | | 209/223.2 |
| 5,886,674 A * | 3/1999 | Yoshimi | | 343/882 |
| 6,094,797 A * | 8/2000 | Sherman | | 29/464 |
| 6,213,631 B1 * | 4/2001 | Miranda | | 366/130 |
| 6,217,248 B1 * | 4/2001 | Reiff | | 403/24 |
| 6,267,543 B1 * | 7/2001 | David et al. | | 411/552 |
| 6,336,766 B1 * | 1/2002 | De Villele | | 403/348 |
| 6,338,649 B1 * | 1/2002 | Smith | | 439/504 |
| 6,416,248 B1 * | 7/2002 | Clark | | 404/10 |
| 6,536,644 B2 * | 3/2003 | Plow | | 226/190 |
| 6,616,369 B2 * | 9/2003 | Clark | | 404/10 |
| 6,634,844 B2 * | 10/2003 | Huber | | 411/551 |
| 6,641,323 B2 * | 11/2003 | Ronsheim | | 403/90 |
| 6,733,221 B2 * | 5/2004 | Linger | | 411/84 |
| 6,773,215 B2 * | 8/2004 | Cuva et al. | | 411/553 |
| 2004/0126183 A1 * | 7/2004 | Steiner | | 403/348 |

FOREIGN PATENT DOCUMENTS

| | | |
|---|---|---|
| JP | 2002-048299 | 2/2002 |
| JP | 2003-526759 | 9/2003 |

\* cited by examiner (a)

(b)

(a)

(b)

COUPLING APPARATUS FOR PASSAGE BLOCKS

BACKGROUND OF THE INVENTION

1. Field of the Invention

This invention relates to a coupling apparatus for passage blocks that is desirably used, for example, upon coupling a mass-flow controller used for a fluid control apparatus with a block-shaped joint member that is made to abut against the controller.

2. Description of the Related Art

A fluid control apparatus to be used for a semiconductor manufacturing device and the like has a structure in which various fluid control devices are placed in a plurality of rows, with passages of the fluid control devices on the adjacent rows being connected to each other at a predetermined position by device connecting means, and in recent years, in the fluid control apparatus of this kind, an attempt has been made to provide an integrated structure in which a mass-flow controller, a switching valve and the like are connected to one another without using tubes. In such a fluid control apparatus, a passage block (an upper-stage passage block) is placed on each of the two sides of a mass-flow controller and this is coupled with a block-shaped joint member (a lower-stage passage block) by two bolts from above (for example, Patent Document 1: Japanese Unexamined Patent Publication No. 8-326943).

In the above-mentioned fluid control apparatus, a number of processes are required upon attaching the upper-stage passage block to the lower-stage passage block; consequently, improving the efficiency of the bolt-fastening jobs, that is, in particular, positioning between a bolt insertion hole of the upper-stage passage block and a screw hole of the lower-stage passage block and a reduction in the number of bolts, becomes an important subject.

SUMMARY OF THE INVENTION

An objective of the present invention is to provide a coupling apparatus for passage blocks, which, upon attaching an upper-stage passage block to a lower-stage passage block, can easily carry out a positioning process between a bolt insertion hole of the upper-stage passage block and a screw hole of the lower-stage passage block, and also reduce the number of bolts.

A passage block coupling apparatus in accordance with a first aspect of the invention, which couples an upper-stage passage block having a downward opening and a lower-stage passage block having an upward opening with each other by using a bolt, with the openings being made to mutually abut against each other, is provided with a bolt insertion hole and a pin insertion hole formed in the upper-stage passage block so as to sandwich the opening, a screw hole and a non-screw hole that are formed in the lower-stage passage block respectively in association with the bolt insertion hole and the pin insertion hole of the upper-stage passage block, a bolt that is inserted into the bolt insertion hole of the upper-stage passage block, and threaded with the screw hole of the lower-stage passage block, and a positioning pin that is inserted to the pin insertion hole of the upper-stage passage block, with its lower end portion being fitted to the non-screw hole of the lower-stage passage block.

In this structure, a cut-out section is formed near the lower end portion of the positioning pin, with the diameter of the non-screw hole being made larger than the diameter of the lower end portion of the positioning pin, and a protruding portion to be fitted to the cut-out section of the positioning pin is formed on the non-screw hole so that the cut-out section of the positioning pin and the protruding portion of the non-screw hole are preliminarily fitted with each other and the bolt is then fastened, and at this time, an evenly fastened state is achieved with the tightening force of the bolt and a pressing force applied by the lower end portion of the positioning pin to the protruding portion of the non-screw hole upward, being well balanced with each other, so that the passage blocks are mutually coupled with each other.

A passage block coupling apparatus in accordance with a second aspect of the invention, which couples an upper-stage passage block having a downward opening and a lower-stage passage block having an upward opening with each other by using a bolt, with the openings being made to mutually abut against each other, is provided with a bolt insertion hole and a pin insertion hole formed in the upper-stage passage block so as to sandwich the opening, a screw hole that is formed in the lower-stage passage block in association with the bolt insertion hole of the upper-stage passage block, a positioning pin that is provided on the upper face of the lower-stage passage block so as to protrude upward, and is inserted to the pin insertion hole of the upper-stage passage block, with its upper end portion protruding above the upper face of the block, a fastening auxiliary member having a cut-out section that is fitted to the upper end portion of the positioning pin and a bolt insertion hole corresponding to the bolt insertion hole of the upper-stage passage block, which is superposed on the upper-stage passage block, a coming-off stopping portion, provided on the upper end portion of the positioning pin, which, after the cut-out section of the fastening auxiliary member has been fitted to the upper end portion of the positioning pin, prevents the fastening auxiliary member from moving upward, and a bolt that is inserted into the respective bolt insertion holes of the fastening auxiliary member and the upper-stage passage block, and threaded with the screw hole of the lower-stage passage block, and in this structure, the fastening auxiliary member is provided with a convex arc-shaped bottom face that protrudes downward to the lowest level in the just center between the positioning pin center axis and the bolt center axis so that, upon tightening the bolt, an evenly fastened state is achieved with the tightening force of the bolt and a pressing force applied downward by the coming-off stopping portion to the fastening auxiliary member being well balanced with each other, so that the passage blocks are mutually coupled with each other.

Here, in the present specification, the passage block is defined as a rectangular parallelepiped block with a passage having a through-hole shape, and includes those used as joints, and a block-shaped portion or a main body portion integrally formed in a fluid controller such as a switching valve.

In accordance with the coupling apparatus for passage blocks of the first and second aspects of the invention, since a coupling process is carried out by using a single bolt, the number of bolts can be reduced, and prior to tightening the bolt, the position of the upper-stage passage block relative to the lower-stage passage block is regulated by a positioning pin; therefore, it becomes possible to easily carry out a bolt-engaging job to the screw hole.

BRIEF DESCRIPTION OF THE DRAWINGS

FIG. 1(a) is a perspective view, and FIG. 1(b) is a front cross-sectional view, which shows a first process of coupling processes.

FIG. 2(a) is a perspective view, and FIG. 2(b) is a front cross-sectional view, which shows an intermediate process of the coupling processes.

FIG. 3(a) is a perspective view, and FIG. 3(b) is a front cross-sectional view, which shows a finished state of the coupling processes.

FIG. 4(a) is a perspective view, and FIG. 4(b) is a front cross-sectional view, which shows a first process of coupling processes.

FIG. 5(a) is a perspective view, and FIG. 5(b) is a front cross-sectional view, which shows an intermediate process of the coupling processes.

FIG. 6(a) is a perspective view, and FIG. 6(b) is a front cross-sectional view, which shows a finished state of the coupling processes.

DETAILED DESCRIPTION OF EXEMPLARY EMBODIMENTS

Referring to Figures, the following description will discuss embodiments of the invention. In the following explanation, right and left refer to the right and left sides of each of the Figures (b), and front refers to the surface side of the paper of each of the Figures, and rear refers to the reversed side thereof.

Figure 1:
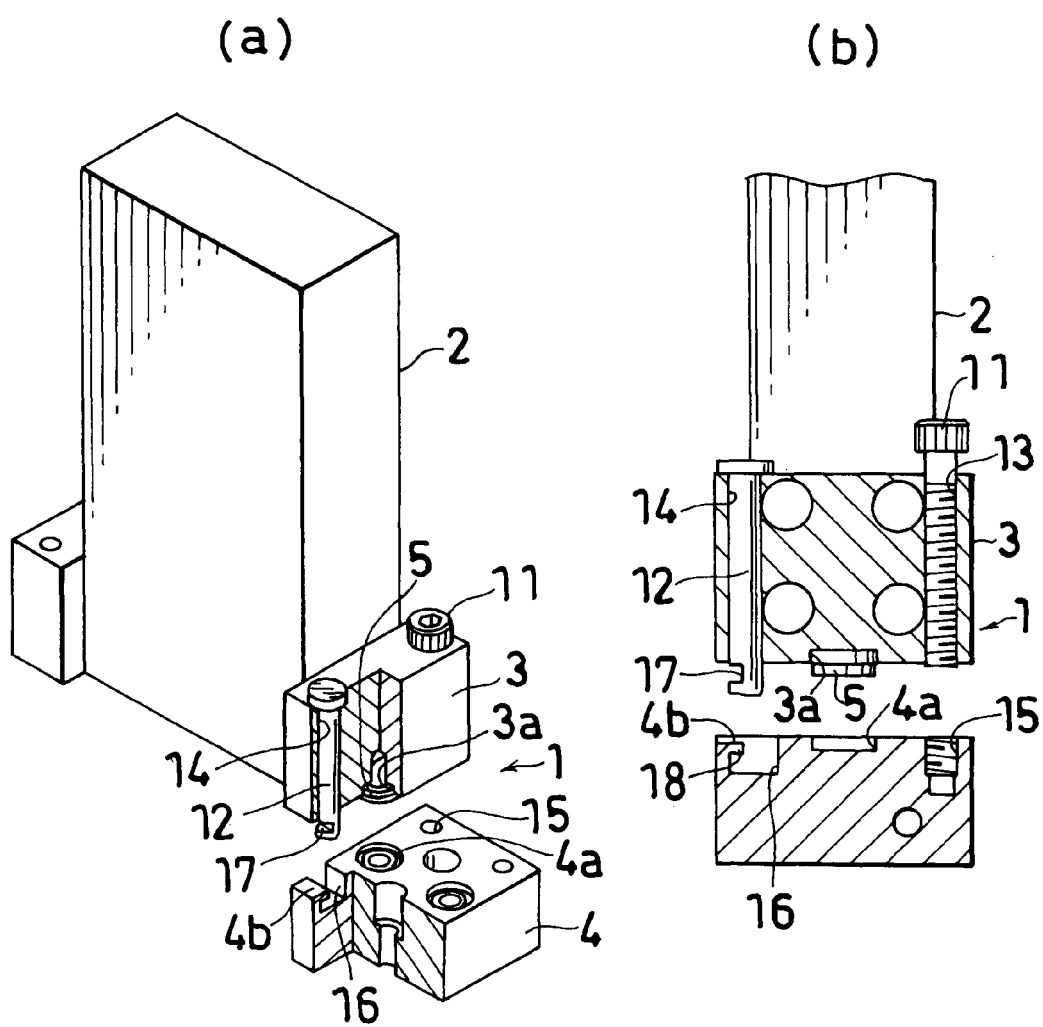
FIGS. 1(a) and 1(b) show an embodiment of a passage block coupling apparatus in accordance with a first aspect of the invention.
Figure 2:
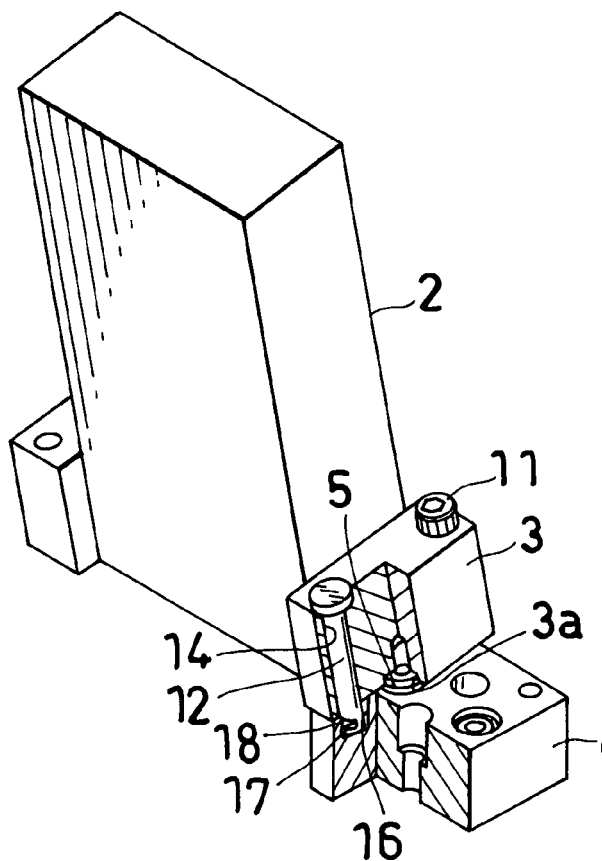
FIGS. 2(a) and 2(b) show the embodiment of the passage block coupling apparatus in accordance with the first aspect of the invention.
Figure 2:
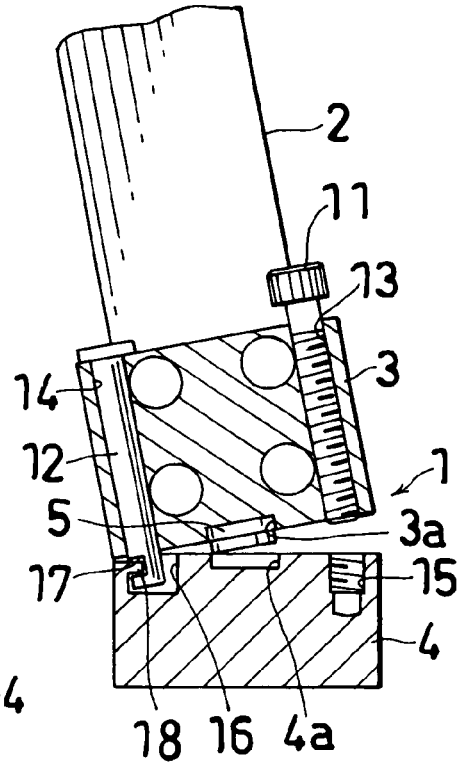
Figure 3:
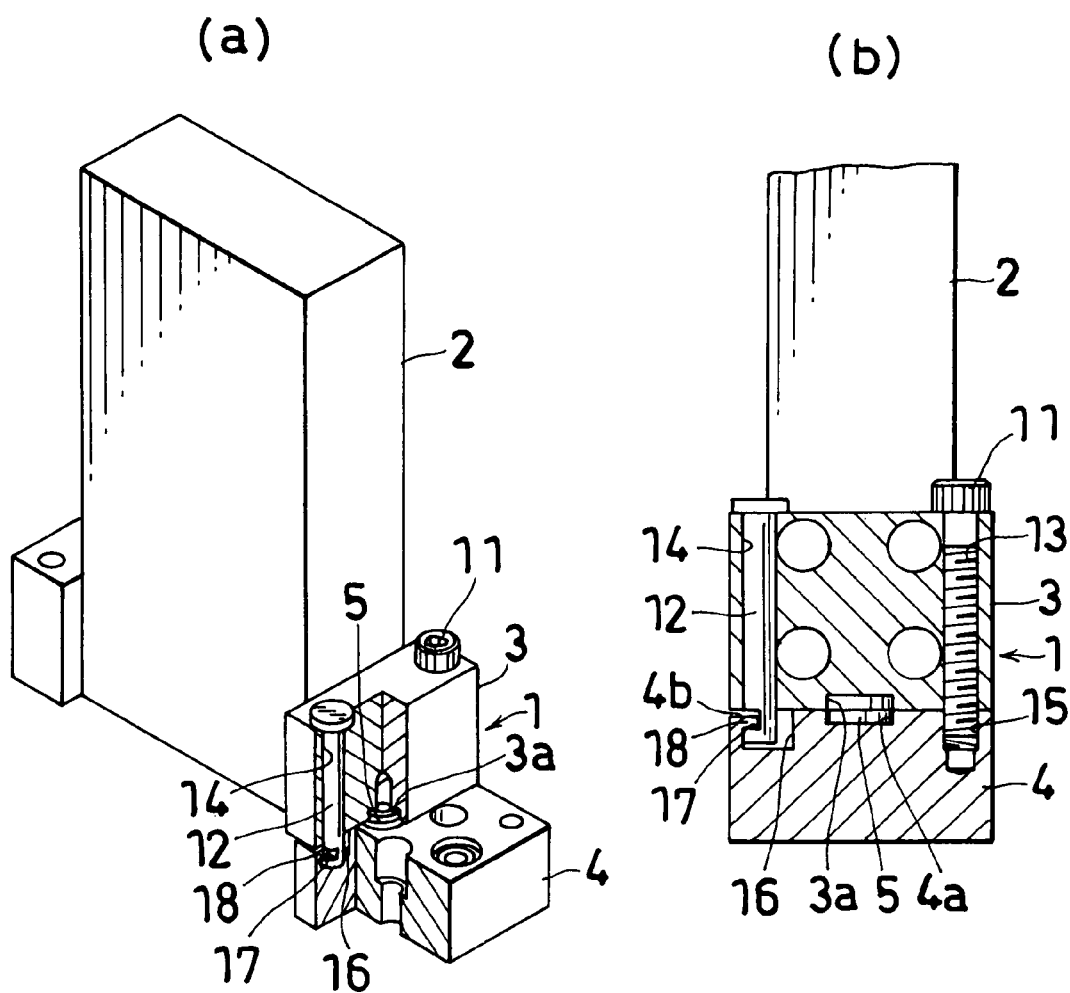
FIGS. 3(a) and 3(b) show the embodiment of the passage block coupling apparatus in accordance with the first aspect of the invention.

FIGS. 1 to 3 show an embodiment of a passage block coupling apparatus of a first aspect of the invention.

The passage block coupling apparatus (1) in accordance with a first aspect of the invention, which couples an upper-stage passage block (3) having a downward opening (3a) and a lower-stage passage block (4) having an upward opening (4a), which are provided, for example, on a mass-flow controller (2), with each other by using a bolt (11), with the openings (3a) and (4a) being made to mutually abut against each other with a seal member (5) interposed there between, is provided with a bolt insertion hole (13) and a pin insertion hole (14) formed in the upper-stage passage block (3) so as to sandwich the opening (3a), a screw hole (15) and a non-screw hole (16) that are formed in the lower-stage passage block (4) respectively in association with the bolt insertion hole (13) and the pin insertion hole (14) formed in the upper-stage passage block (3), a bolt (11) that is inserted into the bolt insertion hole (13) of the upper-stage passage block (3), and threaded with the screw hole (15) of the lower-stage passage block (4), and a positioning pin (12) that is inserted to the pin insertion hole (14) of the upper-stage passage block (3), with its lower end portion being fitted to the non-screw hole (16) of the lower-stage passage block (4).

A cut-out section (17) is formed near the lower end portion of the positioning pin (12), and a protruding portion (18) to be fitted to the cut-out section (17) is formed on the opening portion of the non-screw hole (16) of the lower-stage passage block (4).

The diameter of the non-screw hole (16) of the lower-stage passage block (4) is made larger than the diameter of the lower end portion of the positioning pin (12), and the diameter of the opening portion of the non-screw hole (16) is made slightly smaller than the diameter of the positioning pin (12) because of the formation of the protruding portion (18). The protruding portion (18) is formed so as to extend rightward from the left side face of the non-screw hole (16), and a portion (4b) on the left side from then on-screw hole (16) of the lower-stage passage block (4) is cut off so as to form a slight concave portion in comparison with the other portions. Therefore, as shown in FIG. 2, in a state where the upper-stage passage block (3) is tilted with respect to the lower-stage passage block (4), the lower portion of the positioning pin (12) is fitted to the non-screw hole (16) so that the cut-out section (17) of the positioning pin (12) and the protruding portion (18) of the non-screw hole (16) can be preliminarily fitted with each other; thus, the positioning of the upper-stage passage block (3) onto the lower-stage passage block (4) is carried out. Next, as shown in FIG. 3, in a state where the upper-stage passage block (3) is superposed on the lower-stage passage block (4), a force that presses the protruding portion (18) of the non-screw hole (16) upward is exerted by the lower end portion of the positioning pin (12). Thereafter, the bolt (11) is fastened, and at this time, a tightening force (a force exerted by the bolt (11) to draw the lower-stage passage block (4) upward) and a force exerted by the lower end portion of the positioning pin (12) to press the protruding portion (18) of the non-screw hole (16) upward are balanced with each other, and consequently, an evenly fastened state is achieved so that the passage blocks (3) and (4) are coupled with each other.

In accordance with the coupling apparatus (1) for passage blocks of the first aspect of the invention, because a coupling process is carried out by using a single bolt (11), the number of bolts can be reduced, and prior to tightening the bolt, the position of the upper-stage passage block (3) relative to the lower-stage passage block (4) is regulated by a positioning pin (12); therefore, an engaging job of the bolt (11) to the screw hole (15) can be easily carried out.

Figure 4:
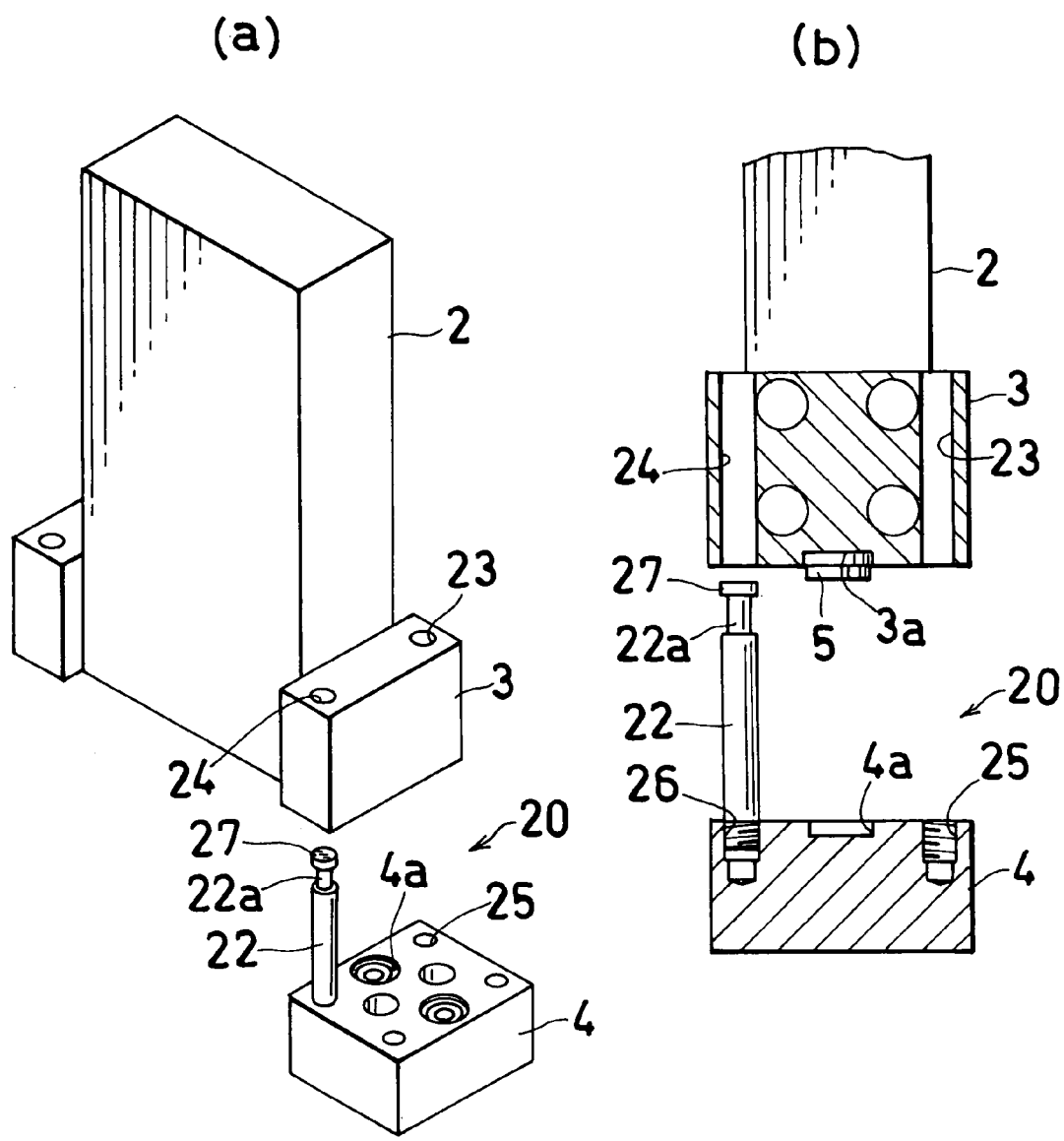
FIGS. 4(a) and 4(b) show an embodiment of a passage block coupling apparatus in accordance with a second aspect of the invention.
Figure 5:
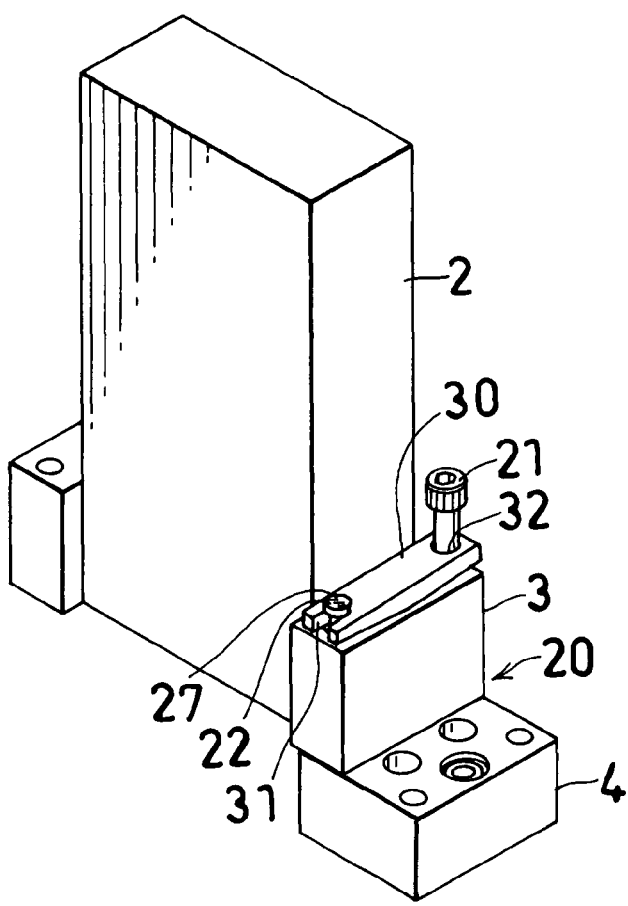
FIGS. 5(a) and 5(b) show the embodiment of the passage block coupling apparatus in accordance with the second aspect of the invention.
Figure 5:
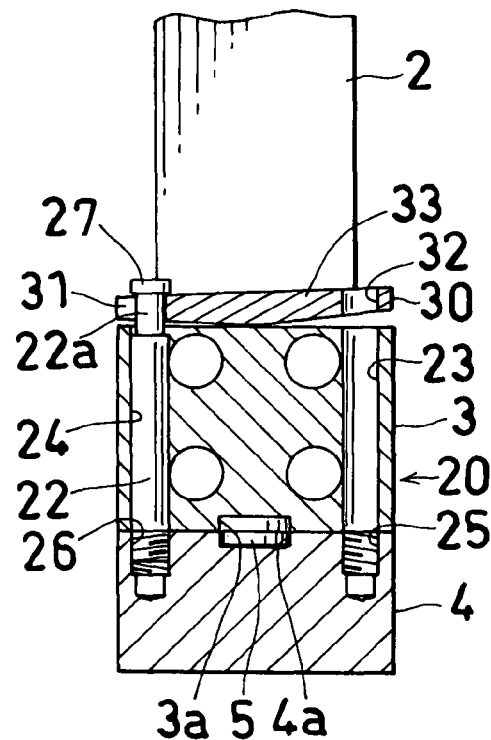
Figure 6:
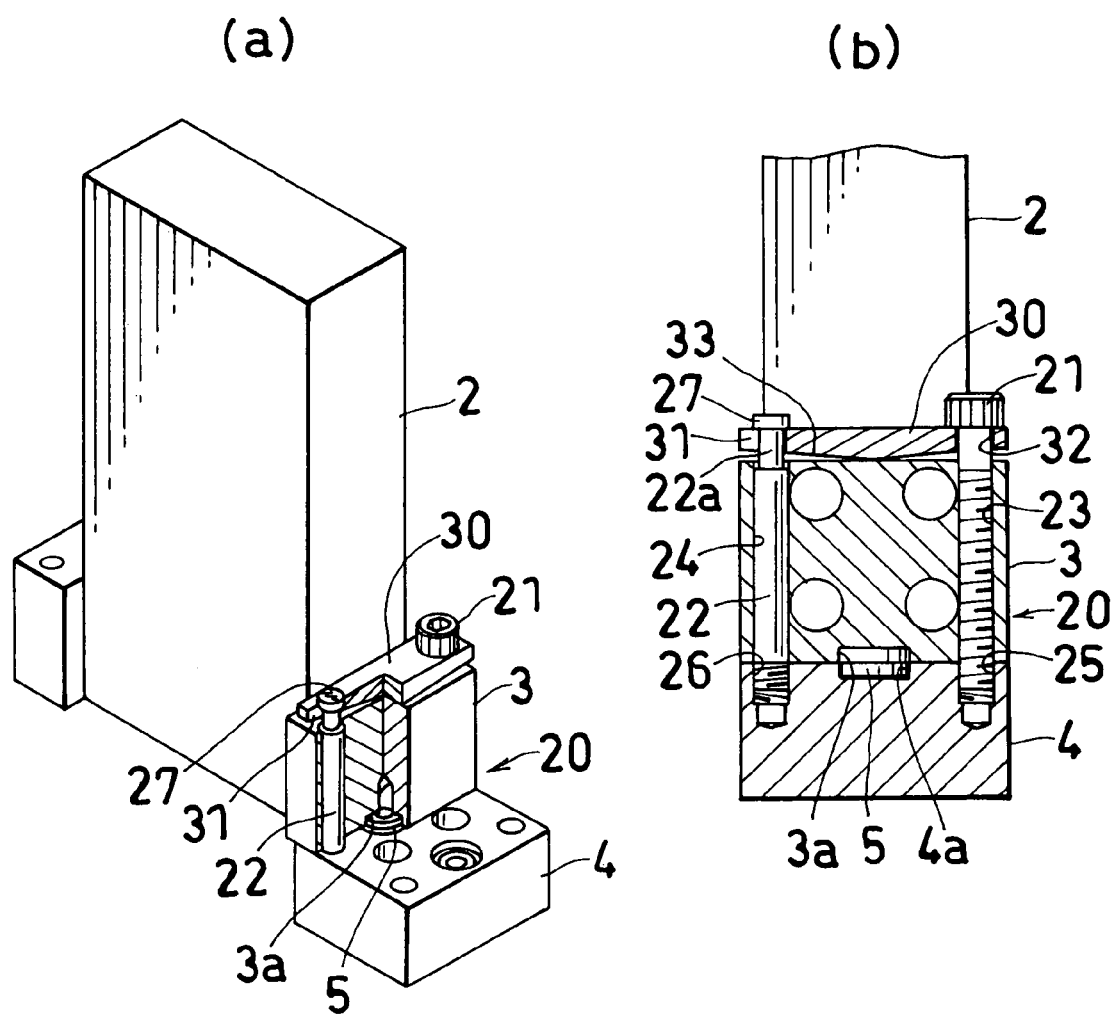
FIGS. 6(a) and 6(b) show the embodiment of the passage block coupling apparatus in accordance with the second aspect of the invention.

FIGS. 4 to 6 show an embodiment of a passage block coupling apparatus of a second aspect of the invention.

The passage block coupling apparatus (20) in accordance with a second aspect of the invention, which couples an upper-stage passage block (3) having a downward opening (3a) and a lower-stage passage block (4) having an upward opening (4a), which are formed, for example, on a mass-flow controller (2), with each other by using a bolt (21), with the openings (3a) and (4a) being made to mutually abut against each other with a seal member (5) interposed there between, is provided with a bolt insertion hole (23) and a pin insertion hole (24) formed in the upper-stage passage block (3) so as to sandwich the opening, a screw hole (25) that is formed in the lower-stage passage block (4) in association with the bolt insertion hole (23) of the upper-stage passage block (3), a positioning pin (22) that is formed on the upper face of the lower-stage passage block (4) so as to protrude upward, and is inserted to the pin insertion hole (24) of the upper-stage passage block (3), with its upper end portion protruding above the upper face of the block (3), a fastening auxiliary member (30) having a cut-out section (31) that is fitted to the upper end portion of the positioning pin (22) and a bolt insertion hole (32) corresponding to the bolt insertion hole (23) of the upper-stage passage block (3), which is superposed on the upper-stage passage block (3), a coming-off stopping portion (27), formed on the upper end portion of the positioning pin (22), which, after the cut-out section (31) of the fastening auxiliary member (30) has been fitted to the upper end portion of the positioning pin (22), prevents the fastening auxiliary member (30) from moving upward, and a bolt (21) that is inserted into the respective bolt insertion holes (32) (23) of the fastening auxiliary member (30) and the upper-stage passage block (3), and threaded with the screw hole (25) of the lower-stage passage block (4).

The positioning pin (22) has a male screw portion on its lower end portion, and is threaded with the screw hole (26) formed in the lower-stage block (4). Since its portion near the upper end is made to have a small diameter (22a), the upper end portion is formed into a coming-off stopping portion (27).

The fastening auxiliary member (30) is provided with a convex arc-shaped bottom face (33) that protrudes downward to the lowest level in the just center between the positioning pin (22) center axis and the bolt (21) center axis.

In the coupling apparatus (20) for passage blocks in accordance with the second invention, first, as shown in FIG. 4, after the positioning pin (22) has been secured onto the lower-stage block (4), the positioning pin (22) is inserted into the pin insertion hole (24) of the upper-stage block (3), and the upper-stage passage block (3) is superposed on the lower-stage passage block (4). Thus, the position of the upper-stage passage block (3) relative to the lower-stage passage block (4) is regulated by the positioning pin (22). Next, as shown in FIG. 5, the fastening auxiliary member (30) is superposed on the upper-stage passage block (3), by fitting its cut-out section (31) to the small diameter portion (22a) of the positioning pin (22). Then, the bolt (21) is inserted into the respective bolt insertion holes (32) (23) of the fastening auxiliary member (30) and the upper-stage passage block (3), and threaded with the screw hole (25) of the lower-stage passage block (4). In this manner, by tightening the bolt (21), a tightening force of the bolt (21) (a force applied by the bolt (21) so as to press the fastening auxiliary member (30) downward) and a force applied by the coming-off stopping portion (27) so as to press the fastening auxiliary member (30) downward are balanced with each other so that an evenly fastened state is achieved so that the passage blocks (3) and (4) are coupled with each other.

In accordance with the coupling apparatus (20) for passage blocks of the second aspect of the invention, since a coupling process is carried out by using a single bolt (21), the number of bolts can be reduced, and prior to tightening the bolt (21), the position of the upper-stage passage block (3) relative to the lower-stage passage block (4) is regulated by a positioning pin (22); therefore, an engaging job of the bolt (21) to the screw hole can be easily carried out.

Figure 7:
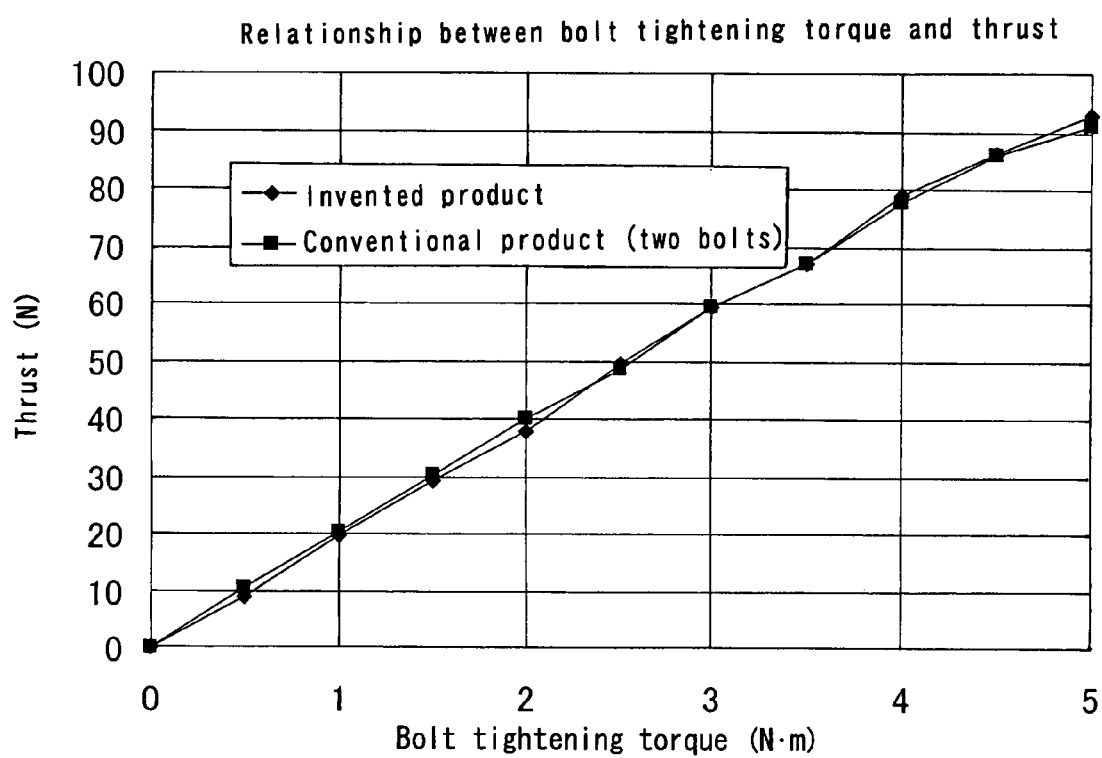
FIG. 7 is a graph that compares the fastened state of the passage block coupling apparatus in accordance with the first and second aspects of the invention with that of a conventional apparatus.

FIG. 7 is a graph that compares the fastened state of the passage block coupling apparatus of each of the first and second aspects of the invention with that of a conventional apparatus. This graph shows the relationship between the bolt tightening torque (N·m) and the thrust (N), and the results indicate that the invented products (coupling apparatuses for passage blocks in accordance with the first and second aspects of the invention) have the same performance as that of the conventional product (which uses two bolts) in terms of data, and make it possible to cut the number of bolts to half, with the same tightening force being maintained.

Here, the lower-stage passage block (4) is coupled with the main body (corresponding to the upper-stage passage block) of a fluid control apparatus (for example, an open/close valve, a filter, or the like) adjacent to a mass-flow controller (2) by the same coupling apparatus as described above or a normal coupling apparatus using two bolts so that the mass-flow controller (2) and another fluid control apparatus are allowed to communicate with each other through the lower-stage passage block (4). The present embodiments have only exemplified a structure in which the upper-stage passage block (3) placed on the mass-flow controller (2) is coupled with the lower-stage passage block (4) serving as a joint member so as to allow this to communicate with another fluid control apparatus; however, not limited to this structure, the coupling apparatus of the invention may be applicable to a coupling process between other fluid control apparatuses as well as between other fluid control apparatus and joining member.

INDUSTRIAL APPLICABILITY

In accordance with the coupling apparatus for passage blocks of the present invention, when it is applied to a fluid control apparatus that requires a number of processes upon attaching an upper-stage passage block to a lower-stage passage block, the bolt fastening operation can be more effectively carried out, and, in particular, the positioning process between the bolt insertion hole of the upper-stage passage block and the screw hole of the lower-stage passage block is available and the number of bolts can be reduced so that it becomes possible to improve the assembling property of a fluid control apparatus to be used for a semiconductor manufacturing device and the like.

The invention claimed is:

1. A passage block coupling apparatus, including an upper-stage passage block having a downward opening and a lower-stage passage block having an upward opening which are coupled to each other such that the openings are made to mutually abut against each other, comprising:
   a bolt insertion hole and a pin insertion hole formed in the upper-stage passage block so as to sandwich the downward opening;
   a screw hole and a non-screw hole that are formed in the lower-stage passage block, respectively;
   a bolt that is insertable into the bolt insertion hole of the upper-stage passage block, and threaded with the screw hole of the lower-stage passage block; and
   a positioning pin that is insertable into the pin insertion hole of the upper-stage passage block, with a lower end portion thereof being fitted to the non-screw hole of the lower-stage passage block,
   wherein a cut-out section is formed near the lower end portion of the positioning pin, with a diameter of the non-screw hole being made larger than a diameter of the lower end portion of the positioning pin, and a protruding portion to be fitted to the cut-out section of the positioning pin is formed on the non-screw hole so that the cut-out section of the positioning pin and the protruding portion of the non-screw hole are fitted with each other prior to fastening of the bolt to the screwhole of the lower-stage passage block such that an evenly fastened state is achieved with the tightening force of the bolt and a pressing force, applied by the lower end portion of the positioning pin to the protruding portion of the non-screw hole upward, so that the passage blocks are mutually coupled with each other.

* * * * *